Feb. 1, 1944.                A. Y. DODGE                 2,340,368
                           AUTOMATIC CLUTCH
                         Filed March 30, 1940
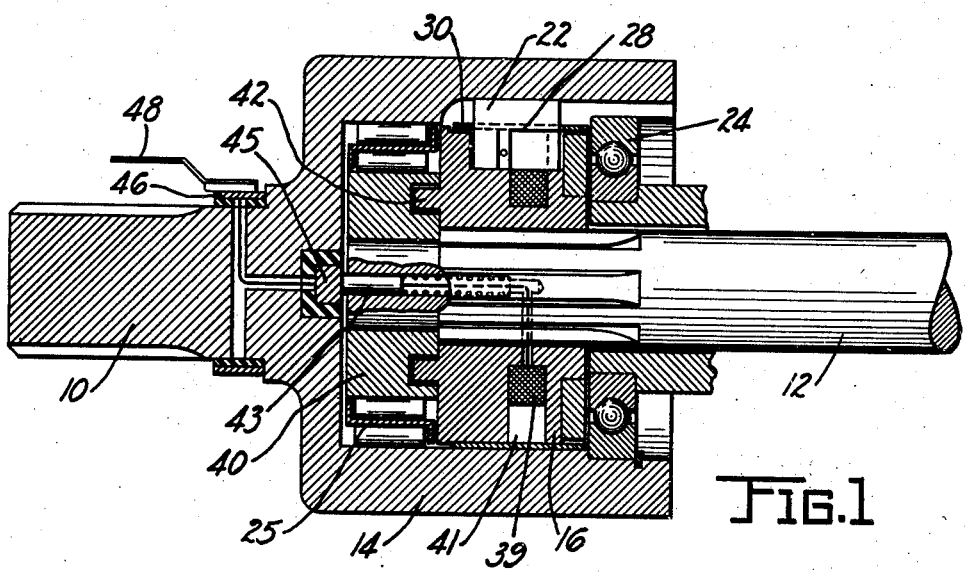
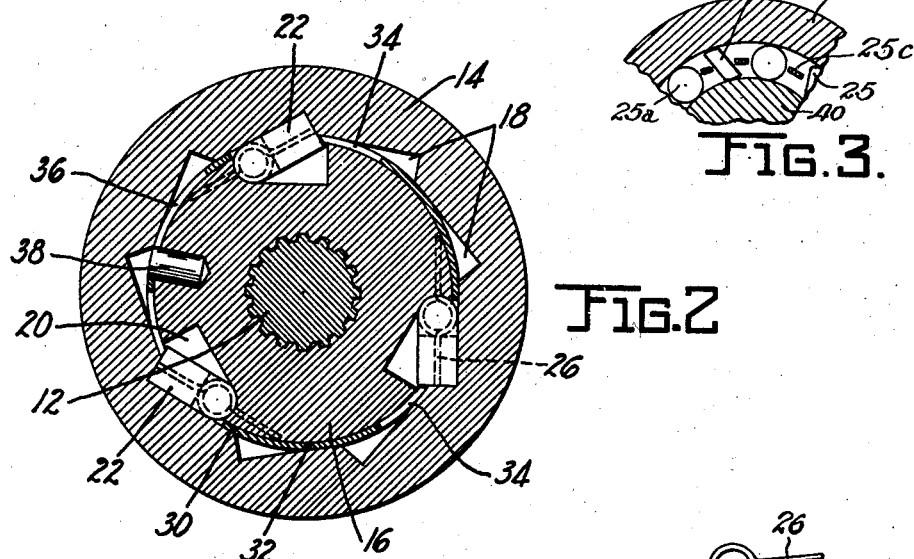
INVENTOR.
ADIEL Y. DODGE
BY Booth & MacDuff
ATTORNEYS.

Patented Feb. 1, 1944

2,340,368

UNITED STATES PATENT OFFICE 2,340,368

AUTOMATIC CLUTCH

Adiel Y. Dodge, Rockford, Ill.

Application March 30, 1940, Serial No. 326,837

9 Claims. (Cl. 192—105)

This invention relates to automatic clutches and more particularly to clutches which move into and out of driving engagement in response to speed variations.

One of the objects of the invention is to provide a positive type automatic clutch which is completely disengaged below a predetermined speed and which automatically engages above that speed. According to one important feature the clutch operates to transmit torque in one direction only when it is in engaging condition.

Another object of the invention is to provide an automatic clutch in which synchronism of the driving and driven parts is insured before the clutch can come into engagement.

A further object of the invention is to provide means to manually or semi-automatically disengage one driving member at any desired speed.

The above and other objects, advantages and novel features of the invention will be apparent from the following description of the embodiment shown in the accompanying drawing, in which:

Figure 1 is an axial section through a clutch embodying the invention;

Figure 2 is a transverse section;

Figure 3 is a partial section looking in the same direction as Figure 2 and showing the one-way clutch mechanism; and Figure 4 is an enlarged side view of the pawl spring.

In the embodiment illustrated, the clutches connect two shafts 10 and 12 either of which may drive the other. The shaft 10 is formed at its end with a cup-shaped portion 14 forming an outer driving member, and the shaft 12 carries within the portion 14 a head member 16. The inner surface of the sleeve portion 14 is formed with a series of diagonal depressions 18 providing ratchet teeth, and the head member 16 is formed with a series of depressions or recesses 20 adapted to receive driving pawls 22. The driving pawls, as shown, are rounded at one end and terminate with a square edge portion at their opposite ends and are adapted to pivot around their rounded ends to fit into the depressions 18 and form a driving connection between the inner and outer members 14 and 16. Preferably, bearings 24 and 25 support the inner and outer members in coaxial relationship.

According to the present invention the pawls 22 are held in place by elongated springs 26 formed of spring wire or the like and having coiled portions intermediate their ends. The pawls 22 are drilled to receive one end of the spring members and the opposite ends of the spring members fit into drilled portions in the head member 16. The intermediate coiled portions of the spring members lie in grooves 28 in the rounded ends of the pawls so that the springs serve to support the pawls in place in the recesses 20.

The springs 26 are so constructed as to urge the pawls inwardly in the recesses 20 toward the inner member. In this position the ends of the pawls clear the ratchet teeth 18 and there is no driving connection between the inner and outer members. As the inner member is rotated, centrifugal force on the pawls tends to swing them out to the position shown in Figure 2 and above a predetermined speed they will move to this position into engagement with the ends of the depressions 18. Thus a driving connection, effective in one direction, is established between the inner and outer members, but if the relative rotation of the inner and outer members should be reversed such that, as viewed in Figure 2, the outer member tends to turn clockwise relative to the inner member the pawls will be cammed inwardly.

When the clutch is to be used in a transmission or the like in which overrunning on a reversal of torque is not desired the bearing 25 may be constructed as a combined one-way clutch and bearing of the type disclosed and claimed in my Patent No. 2,113,722. The clutch as shown in Figure 3 is formed by a plurality of anti-friction rollers 25a alternately arranged with a plurality of friction gripper members 25b, the balls and rollers being held separated and in place by a cage 25c. When this construction is employed the clutch is free in one direction at low speed but drives in both directions when the pawls 22 are in engagement with the ratchet teeth 18.

Means are provided according to the invention to prevent engagement of the pawls at times when the inner and outer members are rotating rapidly relative to each other. Such means as shown comprises a sleeve 30 split at 32 and expanded into engagement with the outer member 14, so as to be frictionally engaged thereby. The sleeve is formed with a series of openings 34 adapted in one position to register with the pawls 22 so that the pawls may move through the openings into engagement with the ratchet teeth. If the sleeve is turned, a solid portion thereof will overlie the free ends of the pawls so as to hold them in the recesses 20 and prevent driving engagement. In order to limit motion of the sleeve to the two effective positions it is provided with an elongated slot 36, the ends of which engage a pin 38 carried by the head 16 to limit relative movement between the sleeve and the head.

In order that the parts 14 and 16 may rotate relatively in a direction reverse to their normal direction of drive through a large enough angle to permit operation of the sleeve 30, lost motion must be provided in connection with the one-way clutch 25. For this purpose the one-way clutch acts between the sleeve 14 and a ring 40 which is rotatable on the end of the shaft 12. The ring 40 is formed with a pair of circumferentially extending grooves into which lugs 42 on the head 16 fit. When the one-way clutch 25 is engaged the head 16 may turn relative to the ring 40 and sleeve 14 until lugs 42 reach the ends of the grooves in the ring and this motion is sufficient to enable operation of the sleeve 30.

In operation of this construction, if the head 16 is stationary or rotating slowly and the sleeve 14 is rotating in a counterclockwise direction relative to the head, as seen in Figure 2, the pawls will be in the recesses 20 and the sleeve 30 will be turned in a counterclockwise direction until the end of the slot 36 engages the pin 38. In this position a solid portion of the sleeve will overlie the free ends of the pawls and will prevent them from moving out into engagement with the ratchet teeth regardless of the speed of rotation of the inner member. To move the sleeve to its other position with the openings 34 clear of the pawls, relative rotation of the head 16 and sleeve 14 must be reversed so that the frictional drag between sleeve 14 and the sleeve 30 will rotate the sleeve 30 to the position shown in Figure 2. At this time the pawls 22 may move out through the openings 34 into engagement with the ratchet teeth to establish a driving connection. It will be noted that the openings 34 are of greater length than the pawls 22 so that a time interval will be provided for the pawls to move out into engagement with the ratchet teeth 18 before the sleeve 32 can again move into position overlying the pawls.

In order that the pawls 22 may be disengaged at high speeds when and if desired, I have provided a coil of magnet wire 39 shown in Figure 1 wound into a slot 41. Suitable electric connections may be provided through a hole in the center of shaft 12 and are shown as including a brush 43 slidable in and insulated from the shaft 12 contacting a conductor plug 45 set in insulation material in the end of shaft 10. The plug 45 is connected to a collector ring 46 mounted on a ring of insulation material pressed on shaft 10 and a brush 48 wipes over the collector ring.

When it is desired to disengage the pawls 22, the torque load is momentarily relieved. This may be done by cutting off the engine ignition (not shown) for a moment, or by lifting the foot from the accelerator pedal (not shown) for a moment. Simultaneously the magnet coil 39 is to be energized by passing electric current through brush 48 and the conductors to coil 39 thence to the ground, thus magnetizing head 16, which attracts pawls 22 thereto, so disconnecting them from sleeve 14.

The clutch described above is particularly advantageous in transmission mechanism in which both the shafts 10 and 12 are driven, and in which it is desired, at times, to connect them. In a construction of this type either shaft may become the driving member, but operation of the clutch is always controlled in response to the speed of the inner member as represented by the shaft 12. The clutch may also be used to connect the transmission driving shaft to the final driven shaft thus to shunt a variable driving mechanism such as a hydraulic device and to produce a positive one-to-one drive.

While one embodiment of the invention has been shown and described in detail it will be understood that this embodiment is illustrative only and is not to be taken as a definition of the scope of the invention, reference being had for this purpose to the appended claims.

What is claimed is:

1. An automatic clutch comprising inner and outer coaxial driving members, the outer member being formed on its inner surface with a series of depressions to receive ratchet pawls, the inner member being formed on its outer surface with a depression, a pawl loosely mounted in the last-named depression, and an elongated spring having one end secured to the pawl and its other end secured to the inner member, said spring pivotally securing one end of the pawl in place in the last-named depression and resiliently urging the pawl toward the inner member.

2. An automatic clutch comprising inner and outer coaxial driving members, the outer member being formed on its inner surface with a series of depressions to receive ratchet pawls, the inner member being formed on its outer surface with a depression, a pawl pivotally mounted at one end in the last-named depression, resilient means urging the free end of the pawl toward the inner member, and a sleeve mounted between the inner and outer members and formed with openings which in one position of the sleeve clears the pawl whereby its free end may move through the openings into register with the outer member to establish a one-way drive connection therewith, said sleeve, in another position, engaging the pawl to prevent movement thereof away from the inner member, and interengaging means on the sleeve and the inner member to limit relative rotation therebetween.

3. An automobile clutch comprising inner and outer coaxial driving members, the outer member being formed on its inner surface with a series of depressions to receive ratchet pawls, the inner member being formed on its outer surface with a depression, a pawl pivotally mounted at one end in the last-named depression, resilient means urging the free end of the pawl toward the inner member, a sleeve loosely mounted between the inner and outer members and formed with openings which, in one position of the sleeve, uncovers the pawl, said sleeve in another position engaging the pawl to hold it within the inner member, the sleeeve frictionally engaging the outer member to be driven thereby.

4. An automatic clutch comprising inner and outer coaxial driving members, the outer member being formed on its inner surface with a series of depressions to receive ratchet pawls, the inner member being formed on its outer surface with a depression, a pawl movably mounted on the last-named depression, resilient means urging the pawl toward the inner member, a split sleeve loosely mounted between the inner and outer member and yieldingly biased into engagement with the outer member and formed with openings which, in one position of the sleeve, uncovers the pawl, said sleeve in another position engaging the pawl to prevent it moving into engagement with the outer member.

5. An automatic clutch comprising inner and outer coaxial driving members, the outer member being formed on its inner surface with a series of depressions to receive ratchet pawls, the inner member being formed on its outer surface with a depression, a pawl movably mounted in the last-named depression, resilient means urging the pawl toward the inner member, a split sleeve mounted between the inner and outer members and yieldingly biased into engagement with the outer member and formed with openings which, in one position of the sleeve, uncovers the pawl, said sleeve in another position engaging the pawl to hold it within the inner member, and interengaging parts on the sleeve and the inner member to limit relative movement therebetween.

6. An automatic clutch comprising inner and outer coaxial driving members, the outer member being formed on its inner surface with a series of ratchet teeth and the inner member having in its outer surface a pawl-receiving recess, a pawl mounted in said recess for pivotal movement about one end so that its other end may move into engagement with the ratchet teeth to transmit torque in one direction, and resilient means urging the pawl into the recess and yieldable in response to a predetermined speed of rotation of the inner member so that the pawl may pivot into engagement with the ratchet teeth, and a sleeve movably mounted between the inner and outer member and in one position engaging said other end of the pawl to hold it in the recess, said sleeve having an opening therein which in another position of the sleeve registers with the pawl so that the pawl may project through the opening into engagement with the ratchet teeth.

7. An automatic clutch comprising inner and outer coaxial driving members, the outer member being formed on its inner surface with a series of ratchet teeth, the inner member being formed on its outer surface with a recess, a pawl movably mounted in the recess and adapted to move out into engagement with the ratchet teeth to connect the inner and outer members for rotation in one direction, a sleeve loosely mounted between the members and having an opening therein through which the pawl may move when the sleeve is in one position, said sleeve in another position engaging the pawl to hold it in the recess, one-way driving means engaging one of said members, and a lost motion connection between said one-way driving means and the other member.

8. An automatic clutch comprising coaxial driving members, a pawl pivoted to one of said members and engageable with the other to form a driving connection therebetween, and magnetic means on said one of the members to move the pawl out of engagement with said other member.

9. An automatic clutch comprising inner and outer coaxial driving members, a pawl pivoted on the inner driving member and movable into engagement with the outer driving member in response to centrifugal force, and magnetic means fixed on the inner driving member and acting directly on the pawl to move it out of engagement with the outer driving member.

ADIEL Y. DODGE.